March 31, 1931.  C. W. McKINLEY  1,798,947

OIL FILTER COVER ASSEMBLY

Filed Aug. 17, 1927

Inventor
Charles W. McKinley
By Blackmore, Spencer & Hulbi
Attorneys

Patented Mar. 31, 1931

1,798,947

UNITED STATES PATENT OFFICE

CHARLES W. McKINLEY, OF FLINT, MICHIGAN, ASSIGNOR TO A C SPARK PLUG COMPANY, OF FLINT, MICHIGAN, A COMPANY OF MICHIGAN

OIL-FILTER-COVER ASSEMBLY

Application filed August 17, 1927. Serial No. 213,680.

This invention relates to an oil filter and particularly to an improved means of fastening the various fittings to the filter can.

It is the object of the invention to construct a securing means for the fittings of the filter which will render the fittings readily removable and at the same time form a compact construction, and a reinforcement for the filter cover.

The object of the invention is accomplished by placing on the inner side of the filter cover a relatively stiff and unyielding member. This member is preferably a casting having a plurality of threaded openings, and a central opening for the reception of the connection for securing the filtering material to the cover. A triangular casting is used, although the shape is immaterial, and steel may be used instead of a casting. Outside the cover there is applied the fitting which contains the inlet and outlet ports as well as a by-pass. The fitting has openings arranged to conform to the openings of the member on the inside of the cover. Bolts are passed through the openings in the fitting and screwed into the member to rigidly hold the fitting on the filter cover. Gaskets are applied between the fitting and the cover and between the bolt heads and the fitting to form a liquid tight connection. By the application of the reinforcing member on the inside of the cover, the relatively thin metal of the cover will conform itself thereto giving a good seat for the gasket.

The fitting has a passage arranged between the base and the apex of a triangle formed by the bolt holes and a second passage outside the triangle, both passages being preferably, though not necessarily, parallel to the base of the triangle.

The filtering unit may be secured to the cover either by means of a nut threaded onto an extension passing through the opening in the reinforcing member or by means of a pipe which may be riveted over onto the other portion of the filter cover.

The invention is disclosed in the accompanying drawings in which.

Figure 1:
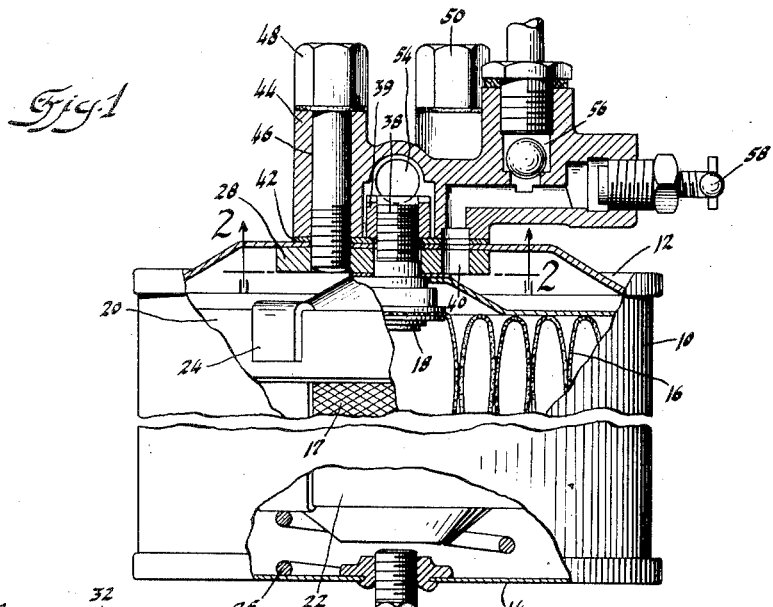
Figure 1 is a view of a filter with the present invention applied thereto, parts being shown in section for purposes of clearer illustration.

Referring to the number parts on the drawing, 10 indicates a filter can having a wall or cover 12 and a bottom 14. Within the can there is positioned filtering material 16, secured to a stud 18 and held in place by means of the screen 17, the upper and lower stampings 20 and 22, and the straps 24. A spring 26 rests on the bottom 14 and presses upwardly on the lower stamping 22 and assists in maintaining the filtering material in position. The parts so far described are conventional and form no part of the invention.

Figure 2:
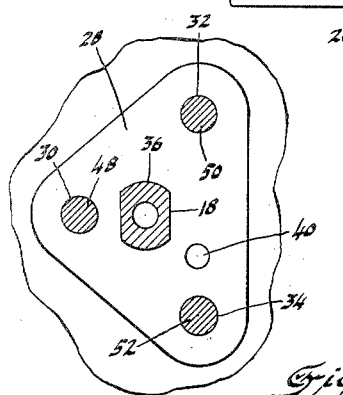
Figure 2 is a bottom plan view of the casting taken on the line 2—2 of Figure 1.
Figure 3:
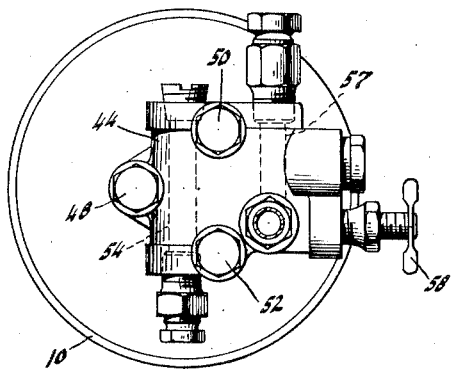
Figure 3 is a plan view on a reduced scale of a structure of Figure 1.

Positioned on the inside of the cover is a reinforcing member 28 of any suitable kind but is preferably in the form of a casting or stamping having a plurality of threaded openings shown as three in number, 30, 32 and 34, arranged in triangular formation as is seen in Figure 2, although any number of openings may be used. The central portion of the casting 28 has an opening 36 through which is passed the threaded end 38 of the stud 18. The casting is further provided with an opening 40 which serves as an outlet passage for the oil from the filter. Positioned on the opposite side of the cover is a gasket 42 having openings to conform to the openings of the reinforcing member 28. Seated on the gasket 42 is the fitting 44 provided with a plurality of openings 46, which conform to the openings in the member 28.

Passing through the openings 46 and threaded into the openings 30, 32 and 43 respectively are the bolts 48, 50 and 52 which serve as a means for securing the fitting onto the cover 12. Gaskets are placed between the bolt heads and the fitting and a nut 39 secures the stud 18 to the cover 12. When the bolts 30, 32 and 34 are turned home, they will cause the relatively thin cover 12 to be clamped between the relatively stiff and unyielding fitting 44 and member 28 there forming a good seat for the gasket 42.

Considering the line through the bolts 50 and 52 as the base of a triangle it will be noted that the fitting 44 has an inlet passage 54 positioned between the base and apex of the triangle and arranged parallel to the base. The fitting is further provided with an outlet passage 56 and a passage 57 which is generally parallel to the base 50 and 52, but which lies without the triangle. It will thus be seen that the fitting has one passage 54 between the bolts and a second passage 57 outside thereof.

The fitting is provided with the usual by-pass (not shown) between the inlet and outlet ports and with the test valve 58. These parts are conventional and form no part of the invention.

Figure 4:
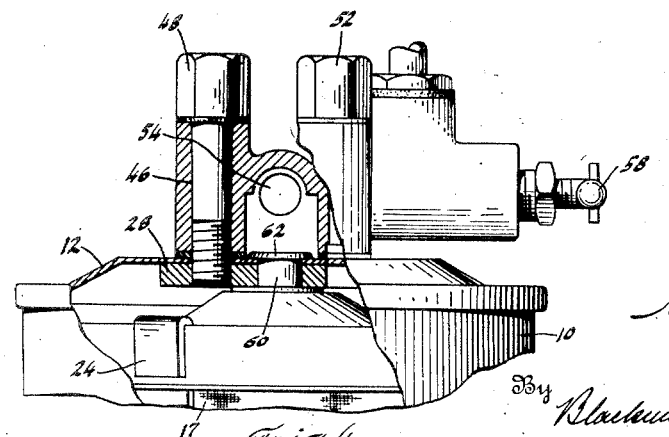
Figure 4 is a view similar to Figure 1 of a modified form of the filter securing means.

The construction of Figure 4 differs from that of Figure 1 in that a different means of securing the filtering material 16 and its associated parts to the filter cover 12 is provided. Instead of the threaded portion 38 of the stud 18, a pipe 60 is used to form the inlet to the filtering material 16. This pipe is riveted over as shown at 62 in order to form a close contact with the cover 12.

In order to remove the fitting from the filter, all that is necessary is to unscrew bolts 48 from the threaded openings 30, 32 and 34 in the casting 28. This will permit the removal of the fitting and the separation of the old filter from the reinforcing member and the annexation of a new one.

I claim:

1. In an oil filter, a container, a fitting having a plurality of bolt openings, a means for securing the fitting to the filter container comprising a member placed at the wall of the container opposite the fitting, and a plurality of bolts passing through said fitting and member, said bolts arranged at the apices of a triangle and said fitting having an oil passage arranged in a plane parallel to one of the sides of the triangle.

2. In an oil filter, a container, a fitting having a plurality of bolt openings, a means for securing the fitting to the filter container comprising a member placed at the wall of the container opposite the fitting, and a plurality of bolts passing through said fitting and member, said bolts arranged at the apices of a triangle and said fitting having an oil passage outside the triangle.

3. In an oil filter, a container, a triangular plate inside said container abutting one of the filter walls, an oil fitting outside the container and abutting the other side of the wall, bolts arranged at the apices of a triangle and passing through said fitting and wall and entering said plate to secure said parts together, an oil passage in said head inside said triangle, and an oil passage in said head outside said triangle.

In testimony whereof, I affix my signature.

CHARLES W. McKINLEY.